United States Patent
Reddy

(10) Patent No.: US 8,482,241 B2
(45) Date of Patent: Jul. 9, 2013

(54) SYSTEM AND METHOD FOR USING A STEPPER MOTOR AS A ROTARY SENSOR

(75) Inventor: Rakesh Reddy, New Albany, OH (US)

(73) Assignee: Cypress Semiconductor Corporation, San Jose, CA (US)

( * ) Notice: Subject to any disclaimer, the term of this patent is extended or adjusted under 35 U.S.C. 154(b) by 55 days.

(21) Appl. No.: 13/166,134

(22) Filed: Jun. 22, 2011

(65) Prior Publication Data

US 2011/0248662 A1    Oct. 13, 2011

Related U.S. Application Data

(63) Continuation of application No. 12/079,845, filed on Mar. 27, 2008, now Pat. No. 8,063,603.

(60) Provisional application No. 61/011,942, filed on Jan. 22, 2008.

(51) Int. Cl.
G05B 19/40 (2006.01)

(52) U.S. Cl.
USPC ............ 318/685; 318/696; 318/400.35

(58) Field of Classification Search
USPC .............. 318/685, 400.35, 696; 360/73.03
See application file for complete search history.

(56) References Cited

U.S. PATENT DOCUMENTS

| 4,439,717 | A | 3/1984 | Berney |
| 5,264,770 | A * | 11/1993 | Coutu ............... 318/696 |
| 6,469,858 | B1 | 10/2002 | Tsuyuguchi |
| 2003/0019937 | A1 * | 1/2003 | Colley et al. ...... 235/462.36 |
| 2006/0176007 | A1 | 8/2006 | Best |
| 2009/0066278 | A1 | 3/2009 | Arisawa |

OTHER PUBLICATIONS

Allegro Microsystems, Inc., A3992, "DMOS Dual Full-Bridge Microstepping PWM Motor Driver," Datasheet, www.allegromicro. com, 2006; 13 pages.
EXP021XX, EXP021XX.com online Exhibitions, <http://www. expo21xx.net/automation21xx/14249_st2_mechanical-components/default.htm>, "servida," retrieved Dec. 7, 2007; 1 page.
JRC NJM3774, New Japan Radio Co., LTD, "Dual Stepper Motor Driver," Datasheet, Jun. 21, 2005; 9 pages.
Richard Torrens, "4QD-TEC: Electronics Circuits Reference Archive Stepper Motor as Encoder," http://www.4qdtec.com/stpen. html, Aug. 28, 2006; 2 pages.
ST L6206 St. Microelectronics, "DMOS Dual Full Bridge Driver," Datasheet, www.ST.com, Sep. 2003; 23 pages.
USPTO Non-Final Rejection for U.S. Appl. No. 12/079,845 dated Mar. 21, 2011; 4 pages.
USPTO Non-Final Rejection for U.S. Appl. No. 12/079,845 dated Jun. 2, 2010; 4 pages.
USPTO Notice of Allowance for U.S. Appl. No. 12/079,845 dated Jul. 11, 2011, 5 pages.

* cited by examiner

Primary Examiner — Karen Masih

(57) ABSTRACT

A method and apparatus for driving a stepper motor and using the stepper motor as a rotary sensor when the stepper motor is not being driven.

20 Claims, 5 Drawing Sheets

SYSTEM AND METHOD FOR USING A STEPPER MOTOR AS A ROTARY SENSOR

RELATED APPLICATIONS

This application is a continuation of U.S. application Ser. No. 12/079,845 filed Mar. 27, 2008 now U.S. Pat. No. 8,063,603, which claims the benefit of U.S. Provisional Application No. 61/011,942 filed Jan. 22, 2008, the entire contents of which are hereby incorporated by reference herein.

TECHNICAL FIELD

This invention relates to the field of electric motors and, in particular, to stepper motors.

BACKGROUND

A stepper motor is a brushless electric motor that is used when fine and controlled motion is required. A stepper motor can separate a full revolution into a large number of steps. Stepper motors may be designed in a variety of ways; however, the general theme leading to their precise control is an array of poles located on a rotor shaft. The rotor shaft is surrounded by a series of electromagnets. When one electromagnet is energized, the shaft rotates to align a pole with the energized electromagnet. This allows the shaft to rotate in a series of discrete angular intervals, or steps, with one step being taken each time a command pulse is received.

The position of a stepper motor can be controlled without any feedback mechanism. When a definite number of pulses have been supplied, the shaft will have turned through a known angle. This makes the motor ideally suited for open-loop position control.

Stepper motors are used in a wide variety of positioning systems. Their precise control causes stepper motors to be commonly used in computer numerical control (CNC) machines, printers, floppy disk drives, and many other machines.

In certain applications, when the stepper motor is not energized, it becomes critical to recognize the angular position of the rotor. For instance, in industrial controls, as part of a configuration, the position of knobs can be set by a user once and the device could be expected to move the knobs to the corresponding positions whenever the same configuration is reloaded. Typically, this is made feasible by coupling a stepper motor to an optical encoder to form what is conventionally called an integrated stepper motor. The position of the knobs under the physical command of a user is observed by receiving feedback from the encoder.

FIG. 1 is a block diagram illustrating a conventional integrated stepper motor. The integrated stepper motor comprises a conventional stepper motor with an external encoder coupled to the motor shaft. The external encoder may commonly be an optical encoder or a magnetic flux based encoder.

FIG. 2 illustrates an external view of a conventional integrated stepper motor. The figure illustrates how an external encoder may be coupled to the shaft of a stepper motor in order to capture the rotor's motion when being manually turned.

Using an external encoder in conjunction with a stepper motor has several drawbacks. The external encoder can be expensive and dramatically increase the cost of the device. Additionally, the extra component takes up space, which may be at a premium if the device is to be used in small scale application. Finally, the addition of external hardware increases the chances of device failure due to wear and tear.

BRIEF DESCRIPTION OF THE DRAWINGS

The present invention is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of the present invention include various operations, which will be described below. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Reference in the description to "one embodiment" or "an embodiment" means that a particular feature, structure, or characteristic described in connection with the embodiment is included in at least one embodiment of the invention. The appearance of the phrase "in one embodiment" in various places in the specification do not necessarily all refer to the same embodiment.

In general, various embodiments of a method and apparatus are described for using a stepper motor as a rotary sensor. In one embodiment, the method includes driving a stepper motor and using the stepper motor as a rotary sensor when the stepper motor is not being driven. The method also includes detecting a control signal from an external control circuit, allowing power to flow to the stepper motor when the first control signal is detected, and preventing power from flowing to the stepper motor when the first control signal is not detected. Additionally, the method includes sensing a change in voltage across two or more coils in the stepper motor caused by a change in magnetic flux resulting from physical movement of the rotor.

Figure 1:
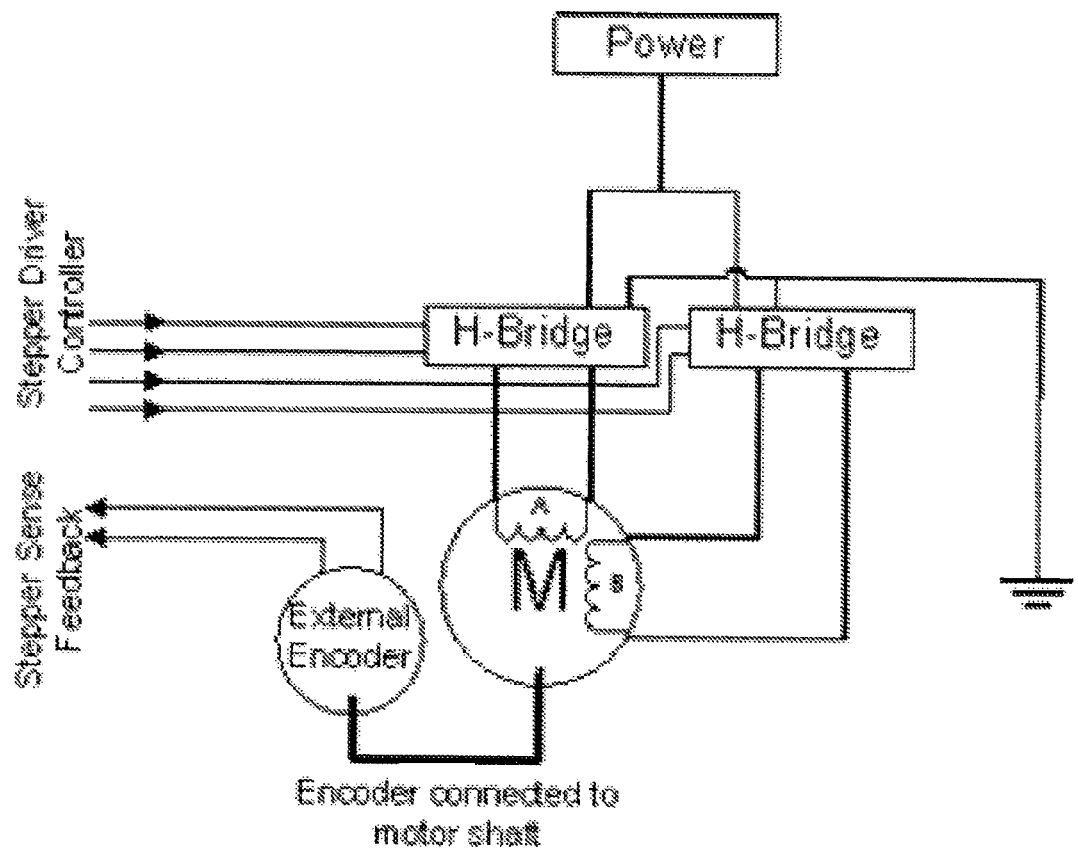
FIG. 1 is a block diagram illustrating a conventional integrated stepper motor.
Figure 2:
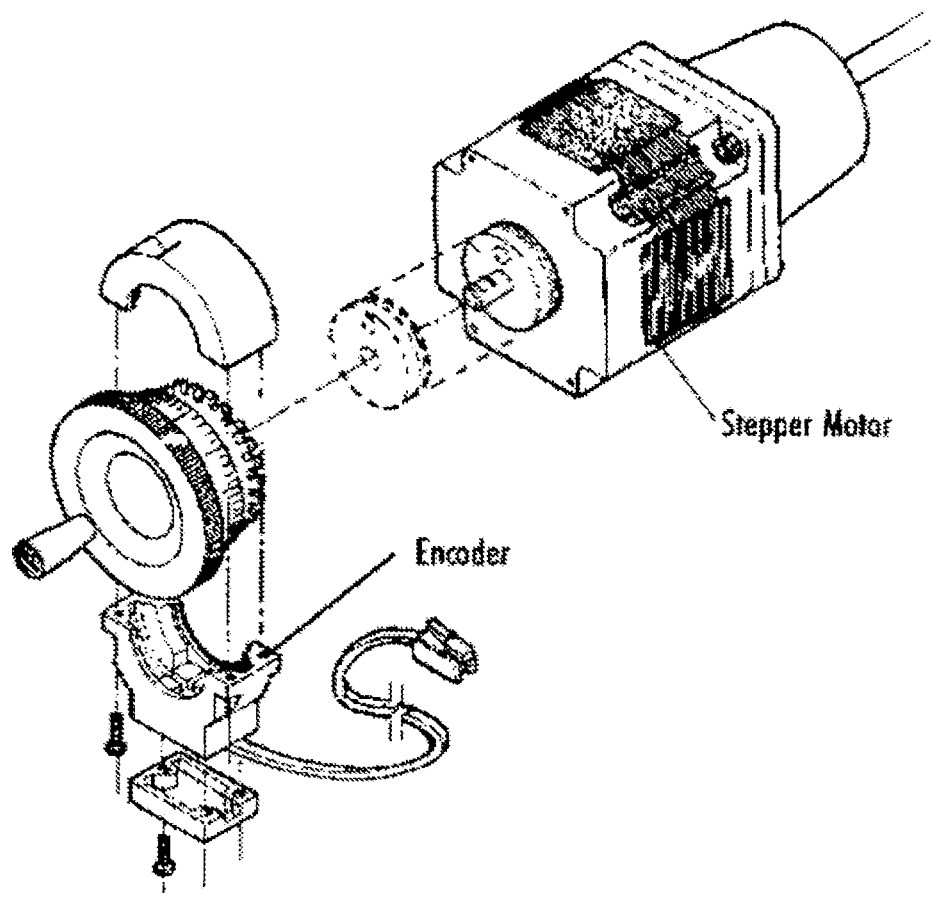
FIG. 2 illustrates an external view of a conventional integrated stepper motor.
Figure 3:
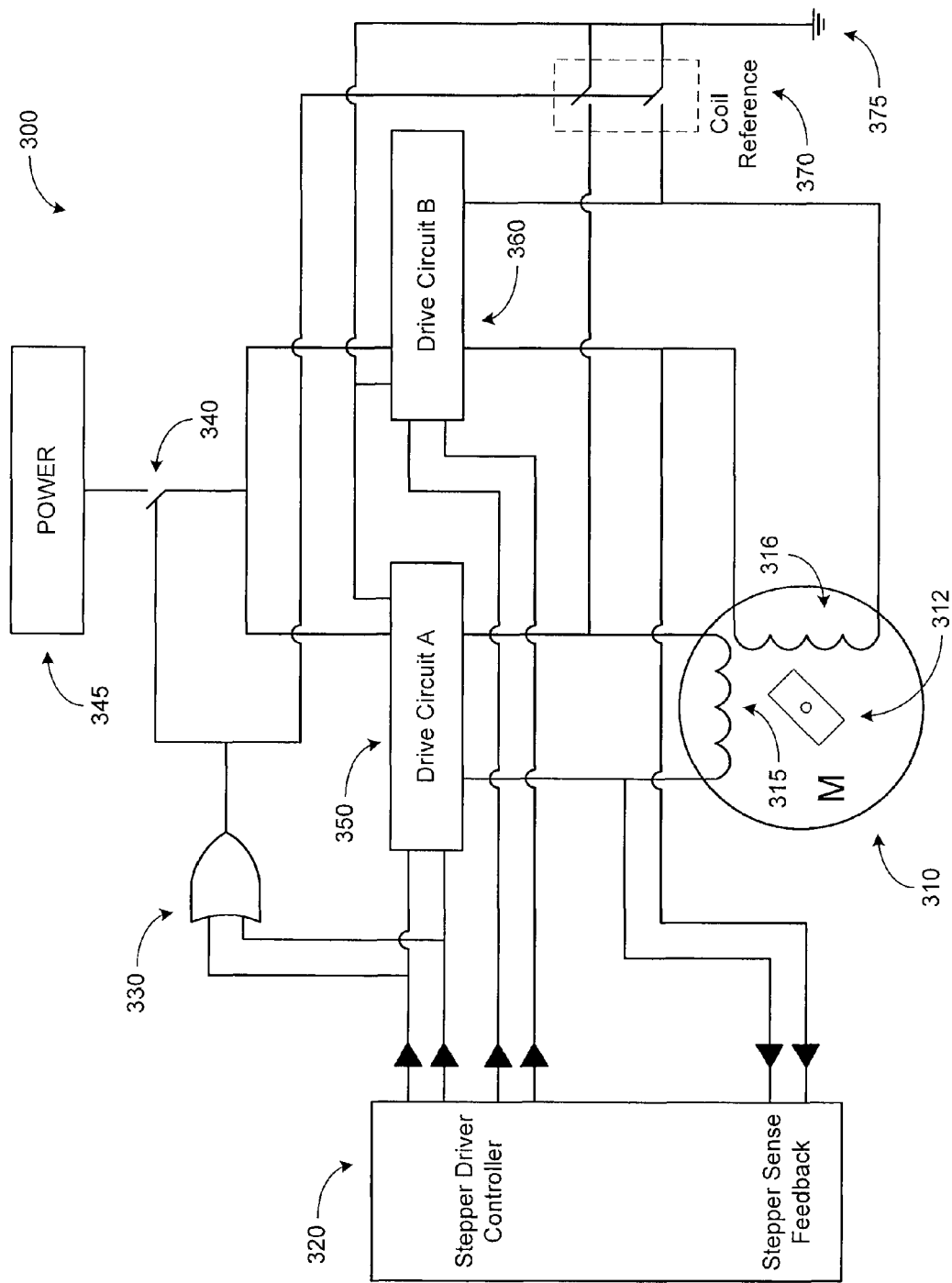
FIG. 3 is a block diagram illustrating a stepper motor that can be used as a rotary sensor according to one embodiment of the present invention.

FIG. 3 is a block diagram illustrating a stepper motor that can be used as a rotary sensor according to one embodiment of the present invention. The circuit 300 is capable of driving a stepper motor 310 and using the stepper motor 310 as a rotary sensor when the stepper motor 310 is not being driven. The circuit 300 first detects the presence of a control signal from an external control circuit 320. In one embodiment, the external control circuit 320 may be a microcontroller or mixed-signal array such as the Programmable System on a Chip (PSoC®) manufactured by Cypress Semiconductor Corporation of San Jose, Calif. Alternatively, other types of devices may be used to provide a control signal. The control signal may include a pulse train sent from the external control circuit such that each pulse in the pulse train causes the stepper motor 310 to rotate one step. Detection of the control signal may be done using appropriate logic 330. The logic 330 may include an OR gate or other combinations of logic gates.

When a control signal is detected, a switch 340 is activated to allow power to flow to the stepper motor 310 and its drive circuitry 350, 360. The power may be received from an external power supply 345. With power flowing, the drive circuitry 350, 360 is energized and the motor 310 may be driven by the control signal. The control signal detection logic 330 will also deactivate the switch 340 when a control signal is not detected. This prevents power from flowing to the stepper motor 310 and its drive circuitry 350, 360.

A stepper motor is composed of two parts, one that rotates and one that is stationary. The part that rotates is called the rotor and the stationary part is called the stator. The stepper motor 310 contains a series of alternating permanent magnetic poles on the rotor 312 with two sets of coils 315, 316 in the stator. The movement of the magnetic poles when the coils 315, 316 are not energized causes a change in magnetic flux resulting in a voltage difference or electromagnetic field (EMF) between the ends of the coils 315, 316. The coils 315, 316 may typically be located perpendicular to each other. The circuit 300 can sense a change in voltage across the coils 315, 316 and detect motion of the rotor 312.

In order to sense a change in voltage across the coils 315, 316 a coil reference tie down 370 may be used. The coil reference tie down 370 is used to reference one end of each coil 315, 316 to a low potential. The coil reference tie down couples one end of each coil 315, 316 to a low potential node 375, such as ground. If the coils 315, 316 are not referenced to ground 375, the motor 310 will be floating and voltage signals may not be read accurately by the external control circuit 320. The coil reference tie down 370 is activated when the control signal sensing logic 330 does not detect a control signal. The coil reference tie down 370 may allow for more accurate reading of the voltage signals. It should be noted that in an alternative embodiment, the coil reference tie down 370 is not used. The coil reference tie down 370 may allow for more accurate reading of the voltage signals.

When one end of each of the coils 315, 316 has been referenced to ground 375, the circuit 300 senses the voltage level at the other end of each of the coils 315, 316. Those voltage readings are transmitted back to the external control circuit 320 where they are interpreted to determine a number of steps through which the rotor was turned as well as the direction of rotation.

Once the control signal sensing logic 330 detects a control signal, it deactivates the coil reference tie down 370 by decoupling the coils 315, 316 from the low potential node 375. The logic 330 also activates the power switch 340 and allows power to flow to the stepper motor 310 and its control circuitry 350, 360. The control circuitry 350, 360 is energized and the control signal is then able to drive the stepper motor 310.

Figure 4:
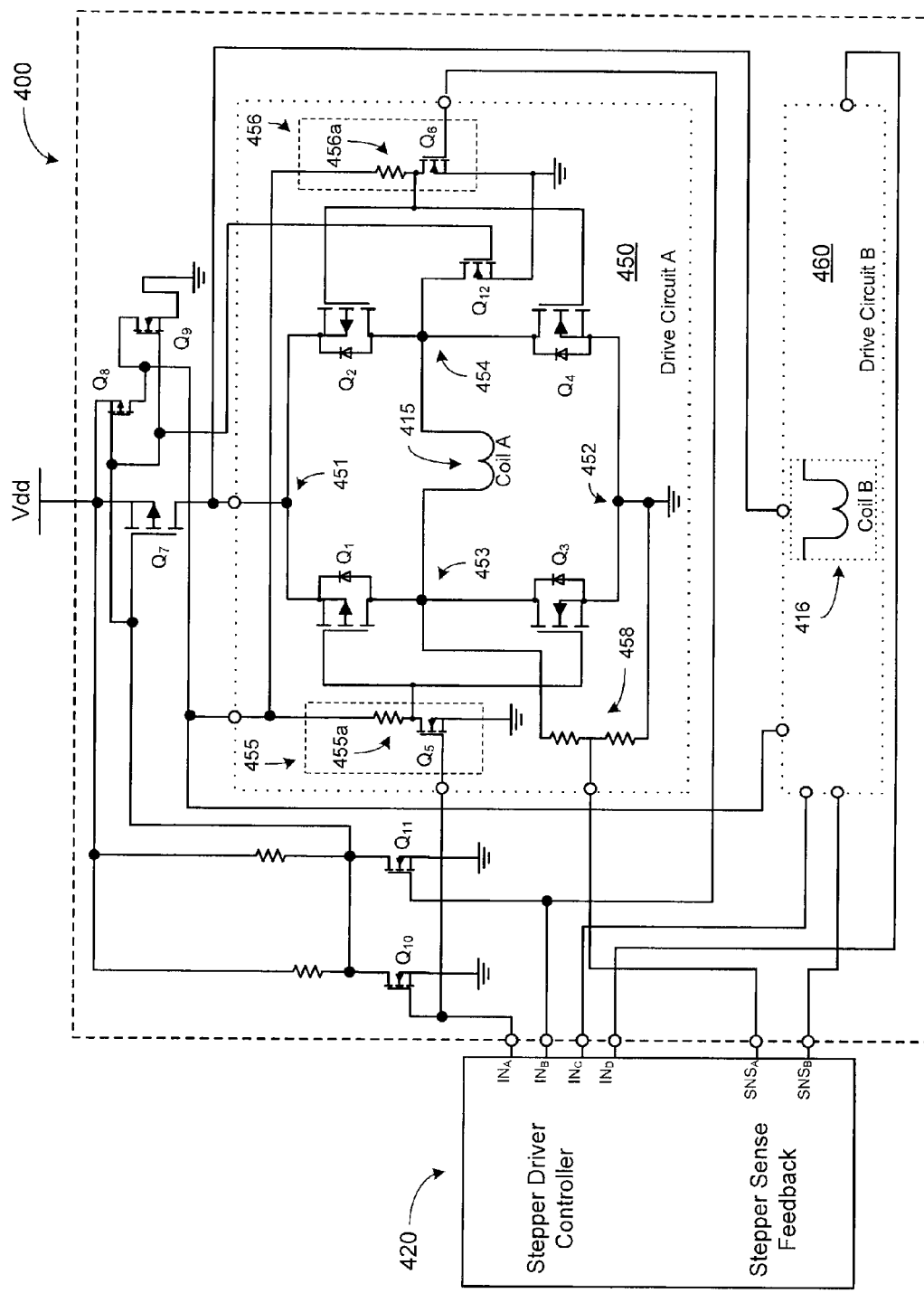
FIG. 4 is a circuit diagram illustrating how a stepper motor can be used as a rotary sensor according to one embodiment of the present invention.

FIG. 4 is a circuit diagram illustrating how a stepper motor can be used as a rotary sensor according to one embodiment of the present invention. A stepper motor may have two magnetic coils 415, 416 in the stator. For each coil 415, 416, there may be a stepper motor drive circuit 450, 460. The drive circuits 450, 460 may be identical to each other. Thus, for purposes of clarity, the first stepper motor drive circuit 450 will be described, with the understanding that the structure may be replicated to form the second stepper motor drive circuit 460.

In one embodiment, the structure 400 includes a first stepper motor drive circuit 450 and logic to regulate the power flow to the first stepper motor drive circuit 450. The first stepper motor drive circuit 450 may include a first transistor Q1, a second transistor Q2, a third transistor Q3, and a fourth transistor Q4. The transistors may be arranged in such a way that the first transistor Q1 and second transistor Q2 share a same first source node 451, and the third transistor Q3 and fourth transistor Q4 may share a same second source node 452. The first transistor Q1 and the third transistor Q3 may share a same first drain node 453 and the second transistor Q2 and the fourth transistor Q4 may share a same second drain node 454. The first source node 451 may be coupled to a high power supply node and the second source node 452 may be coupled to a low power supply node.

The stepper motor drive circuit 450 may also include a first inverter 455 and a second inverter 456. The first inverter 455 may include a first resistor 455a and a first inverter transistor Q5, and the second inverter 456 may include a second resistor 456a and a second inverter transistor Q6. The first inverter 455 may have an output coupled to the gate terminal of the first transistor Q1 and the gate terminal of the third transistor Q3, while the second inverter 456 may have an output coupled to the gate terminal of the second transistor Q2 and the gate terminal of the fourth transistor Q4. The first inverter transistor Q5 and the second inverter transistor Q6 may receive the control signal from the external control circuit 420 at their respective gate terminals. With this structure, the first inverter 455 and the second inverter 456 may be used to control operation of the first transistor Q1, the second transistor Q2, the third transistor Q3 and the fourth transistor Q4.

The drive circuit structure 450 may commonly be known as an H-bridge circuit. The transistors that make up the H-bridge may typically be metal-oxide semiconductor field-effect transistor (MOSFET) devices. Certain application-specific integrated circuit (ASIC) components may be used in place of the discrete parts to form the drive circuit. Such ASICs may be, for example, the L6206 DMOS Dual Full Bridge Driver manufactured by STMicroelectronics of Geneva, Switzerland, the NJM3774 Dual Stepper Motor Driver manufactured by New Japan Radio Co., Ltd. of Tokyo Japan, or the A3992 DMOS Dual Full-Bridge Microstepping PWM Motor Driver manufactured by Allegro MicroSystems, Inc. of Worcester, Mass.

The magnetic coils 415, 416 of the stepper motor may be coupled to each stepper motor drive circuit 450, 460 respectively. The first coil 415 may have a first end coupled to the first drain node 453 and a second end coupled to the second drain node 454. The second coil 416 may be similarly coupled to the second stepper motor drive circuit 460.

The logic to regulate power flow to the first stepper motor drive circuit 450 may include an OR gate or other equivalent logic. The OR gate may include two transistors Q10, Q11. These transistors Q10, Q11 may receive the control signal from the external control circuit 420 at their gate terminals. The output of the OR gate transistors Q10, Q11 may be used to control operation of three power transistors Q7, Q8, Q9. The signal from the drain terminals of the OR gate transistors Q10, Q11 may be received at the gate terminals of the three power transistors Q7, Q8, Q9.

The first power transistor Q7 may have a source terminal coupled to a high potential node and a drain terminal coupled to the first drain node 451 of the drive circuit 450. The second power transistor Q8 may have a source terminal coupled to a high potential node and a drain terminal coupled to the drain terminal of the first inverter transistor Q5 through the first resistor 455a and to the drain terminal of the second inverter transistor Q6 through the second resistor 456a. The third power transistor Q9 may have a source terminal coupled to a low potential node and a drain terminal coupled to the drain terminal of the first inverter transistor Q5 through the first resistor 455a and to the drain terminal of the second inverter transistor Q6 through the second resistor 456a. The first power transistor Q7 may supply power to the first stepper motor drive circuit 450. The second power transistor Q8 may enable operation of the first stepper motor drive circuit 450. The third power transistor Q9 may disable operation of the first stepper motor drive circuit 450. Operation of the circuit will be further described below.

The structure 400 may also contain a reference tie down transistor Q12. The reference tie down transistor Q12 may have a source terminal coupled to a low potential node, a drain terminal coupled to the second drain node 454, and a gate terminal coupled to the output of the OR gate transistors Q10, Q11.

Transistors Q10, Q11 detect the presence of a control signal from external control circuit 420. When a control signal is present, the output of the OR gate transistors Q10, Q11 may be a low signal. This low signal enables the gate terminals of the first power transistor Q7 and the second power transistor Q8 and disables the gate terminals of the third power transistor Q9 and the reference tie down transistor Q12. The first power transistor Q7 allows power to flow to the first stepper motor drive circuit 450. The second power transistor Q8 changes the voltage at the drain terminals of the first inverter transistor Q5 and the second inverter transistor Q6 to a high voltage. In this mode, the control signal from external control circuit 420 can control the stepper motor by energizing transistors Q1, Q2, Q3, Q4 as required.

When a control signal is not present, the output of the OR gate transistors Q10, Q11 may be a high signal. This high signal disables the gate terminals of the first power transistor Q7 and the second power transistor Q8 and enables the gate terminals of the third power transistor Q9 and the reference tie down transistor Q12. Turning the first power transistor Q7 off deactivates the first stepper motor drive circuit 450. When the third power transistor Q9 is turned on, the voltage at the drain terminals of the first inverter transistor Q5 and the second inverter transistor Q6 is a low voltage. When the reference tie down transistor Q12 is turned on, the voltage at the second drain node 454 is low. This causes the second end of the first coil 415 to be referenced to ground. An accurate voltage reading at the first drain node 453 may be taken to determine the voltage across the first coil 415. This reading may then be sent back to the external control circuit 420. The reading may be interpreted to determine the number of steps through which the rotor was turned as well as the direction of rotation. A resistor based voltage divider 458 may be used in the circuit if necessary to protect the external control circuit 420 from any EMF that is greater than the system voltage. The values of the resistors may be determined based on the type of motor and the maximum signal voltage acceptable by the external control circuit 420. Zener diodes may also be used for added protection.

The circuit may then be used to again drive the stepper motor. When a control signal is once again present, the state of the transistors is appropriately changed to enable driving the stepper motor based on the received control signal. The circuit is thus able to alternate between driving the stepper motor and acting as a rotary sensor when not being driven.

Figure 5:
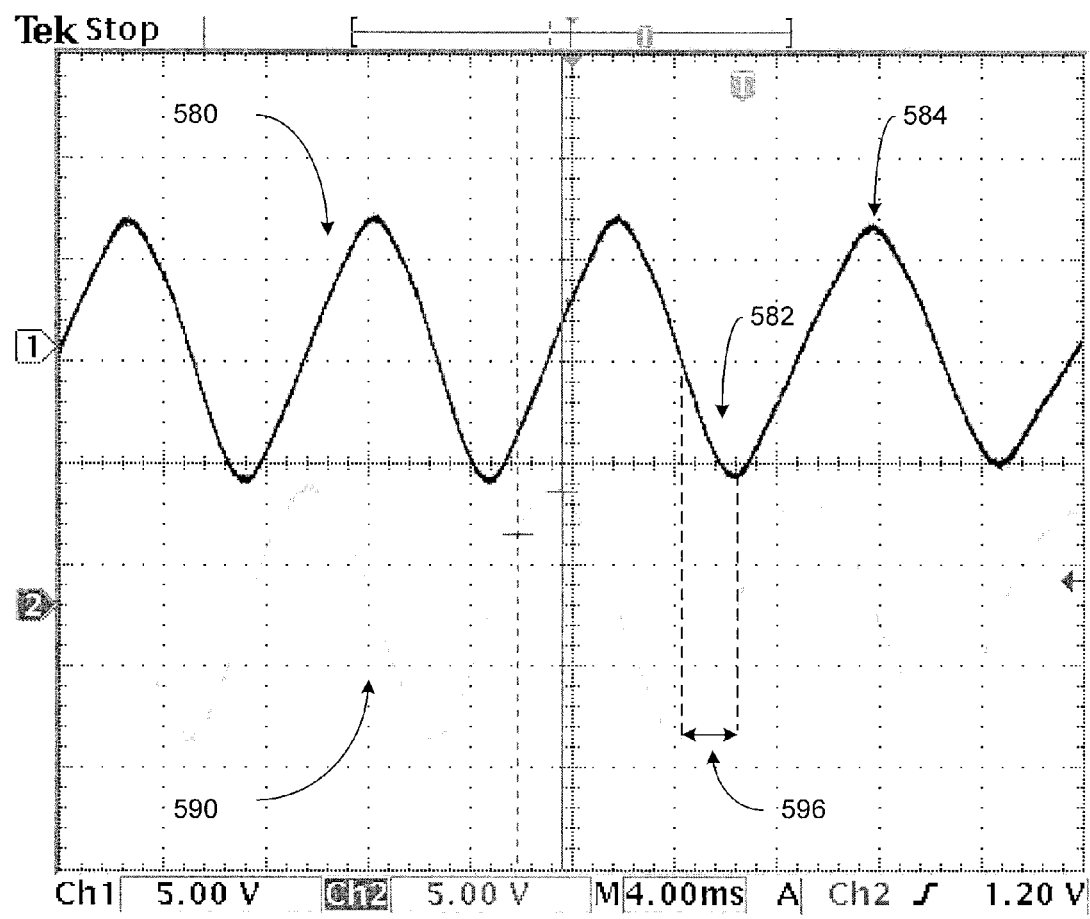
FIG. 5 is a waveform diagram illustrating operation of a stepper motor as a rotary sensor according to one embodiment of the present invention.

FIG. 5 is a waveform diagram illustrating operation of a stepper motor as a rotary sensor according to one embodiment of the present invention. As discussed above, the stepper motor contains a series of alternating permanent magnetic poles on the rotor with two sets of coils in the stator. The movement of these magnetic poles when the coils are not energized causes a change in magnetic flux resulting in a voltage difference or EMF between the ends of the coils. As the coils are typically located perpendicular to each other, the leading coil's EMF is at a 90° phase with the other coil. This is shown in FIG. 5 where a stepper motor, being used as a rotary sensor, is manually turned.

Each trough 582 and crest 584 in the waveform 580 is created when a different pole passes by the particular coil. For example, a 200 step motor would cause 100 crests and 100 troughs. Thus, the number of crests and troughs observed can be used to determine the amount of rotation of the rotor. If the sensing circuit identifies 35 rising edges on a particular coil, the rotor has been turned through 70 steps (35 crests and 35 troughs). Takings the identified 70 steps and dividing it into the total number of possible steps determines the amount of rotation. Multiplying this fraction by 360° will give the degree of rotation. 70 steps/200 total steps*360°=126° degrees of rotation.

The direction of rotation can be identified by observing which waveform leads the other. For example, the first waveform 580, representing the first coil, leads 596 the second waveform 590, representing the second coil. This indicates that the rotor was rotated in the clockwise direction. A counter-clockwise rotation would cause the second waveform 590 to lead the first waveform 580.

The signals indicating the voltage across the first and second coils may be received by the external control circuit for interpretation to determine the amount and direction of rotation. In order to sense the EMF signals, the external control circuit may use two threshold comparators per motor to detect when the EMF signals are above a certain threshold. When the signals pass over a threshold, the rising edge from the comparator causes an interrupt. The system may also use a digital block configured as an inverter to capture the falling edge of each comparator. A timer module may also be used by the system to schedule all processes.

Depending on the model of stepper motor used, a certain amount of hysteresis is required and this may be handled by software. The system may also be used with a wide range of stepper motors. Smaller stepper motors produce smaller voltages, so programmable gain amplifiers may be placed in series with the comparator. Also, the two pins carrying the feedback can be connected to the same analog blocks via a multiplexer to conserve real estate.

In one embodiment the software in the system is set to sense and drive the two motors simultaneously. When one motor is turned, the other motor also turns. Upon startup, all the required parameters of the external control circuit are initialized and the system enters an endless while loop. Each rising or falling edge from the comparators causes an interrupt and the system waits for a minimum of two of them to make a decision about the direction of motion. The external control circuit also disables the interrupt service routines of the inputs associated with the motor being driven to avoid false signals. Unlike typical encoders, at the end of rotation, pulses on both the channels return to ground. The change of state and the associated rising or falling edge that did not occur due to true rotation and is discarded.

There are two signals coming into the microcontroller from the comparators. The lines are referred to as Phases—in accordance with the terminology used for optical encoders. At System Standby, the system is waiting for a rising edge or a falling edge to occur on either Phase. Typically, the microcontroller may be performing other tasks while waiting for an interrupt.

If during System Standby, a rising edge occurs on Phase 1, the system looks to see if Phase 2 is already high. If Phase 2 is already high, the Clockwise Increment function increments a counter for the clockwise direction of rotation. The system then returns to System Standby. If when the rising edge occurs on Phase 1, Phase 2 is not already high, the Phase 1 High Standby state is entered. During the Phase 1 High Standby state, the system looks for Phase 2 to rise or for Phase 1 to fall. If a rising edge is then detected on Phase 2, the Counter-Clockwise Increment function increments a counter for the counter-clockwise direction of rotation and the system returns to System Standby. If, instead a falling edge is detected on Phase 1, the Pulse 1 Detected function records that a pulse occurred on Phase 1 by marking it with a flag. The Pulse 2 Detected function then looks to see if a pulse was previously detected on Phase 2. If a pulse was previously detected on Phase 2, the Pulse 2 Cleared function will clear the flag marking its occurrence. The Clockwise Increment function then increments a counter for the clockwise direction of rotation and the system returns to System Standby. If a pulse was not previously detected on Phase 2, the system returns to System Standby.

If during System Standby, a rising edge occurs on Phase 2, a similar sequence of events occurs with respect to Phase 2.

If during System Standby, a falling edge occurs on Phase 1, the system looks to see if Phase 2 is already high. If Phase 2 is already high, the Counter-Clockwise Increment function increments a counter for the counter-clockwise direction of rotation and the system returns to System Standby. If Phase 2 is not already high, the Clockwise Increment function increments a counter for the clockwise direction of rotation and the system returns to System Standby.

If during System Standby, a falling edge occurs on Phase 2, a similar sequence of events occurs with respect to Phase 2.

Certain embodiments of the method, apparatus, and system described above offer advantages, compared to conventional technologies, including decreasing the cost of the device, decreasing the size of the device and preventing device failure due to wear and tear on additional hardware components.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
   determining whether a control signal is provided by a control circuit;
   if the control signal is not provided, measuring, by the control circuit, a change in voltage across a first stepper motor coil and across a second stepper motor coil, the change in voltage resulting from movement of a rotor; and
   determining a rotation of the rotor from the change in voltage.

2. The method of claim 1, further comprising:
   if the control signal is provided, supplying power to a first stepper motor drive circuit and to a second stepper motor drive circuit.

3. The method of claim 2, further comprising:
   if the control signal is not provided, preventing power from flowing to the first stepper motor drive circuit and to the second stepper motor drive circuit.

4. The method of claim 1, wherein measuring a change in voltage across the first stepper motor coil comprises activating a coil reference tie down by coupling a first end of the first stepper motor coil to a low potential node and measuring a voltage level at a second end of the first stepper motor coil.

5. The method of claim 1, wherein the first stepper motor coil and the second stepper motor coil are oriented perpendicular to each other.

6. The method of claim 1, wherein the rotation comprises a number of steps the rotor was turned through.

7. The method of claim 1, further comprising:
   determining a direction of rotation of the rotor from the change in voltage.

8. An apparatus, comprising:
   a stepper motor comprising a first stepper motor coil, a second stepper motor coil and a rotor;
   a control circuit coupled to the stepper motor; and
   a stepper motor circuit coupled to the control circuit and to the stepper motor, the stepper motor circuit to determine whether a control signal is provided by the control circuit, and if the control signal is not provided, the control circuit to measure a change in voltage across the first stepper motor coil and across the second stepper motor coil, the change in voltage resulting from movement of the rotor, and determine a rotation of the rotor from the change in voltage.

9. The apparatus of claim 8, further comprising:
   if the control signal is provided, the stepper motor circuit to supply power to a first stepper motor drive circuit and to a second stepper motor drive circuit.

10. The apparatus of claim 9, further comprising:
    if the control signal is not provided, the stepper motor circuit to prevent power from flowing to the first stepper motor drive circuit and to the second stepper motor drive circuit.

11. The apparatus of claim 8, wherein measuring a change in voltage across the first stepper motor coil comprises activating a coil reference tie down by coupling a first end of the first stepper motor coil to a low potential node and measuring a voltage level at a second end of the first stepper motor coil.

12. The apparatus of claim 8, wherein the first stepper motor coil and the second stepper motor coil are oriented perpendicular to each other.

13. The apparatus of claim 8, wherein the rotation comprises a number of steps the rotor was turned through.

14. The apparatus of claim 8, the control circuit further to determine a direction of rotation of the rotor from the change in voltage.

15. An apparatus, comprising:
   a stepper motor comprising a first stepper motor coil, a second stepper motor coil and a rotor;
   a stepper motor circuit coupled to the stepper motor, the stepper motor circuit comprising:
      a first stepper motor drive circuit to drive the first stepper motor coil,
      a second stepper motor drive circuit to drive the second stepper motor coil, and
      a switch to supply power to the first and second stepper motor drive circuits if a control signal is provided by a control circuit and to disconnect power from the first and second stepper motor drive circuits if the control signal is not provided by the control circuit;
   the control circuit coupled to the stepper motor circuit, if power is disconnected from the first and second stepper motor drive circuits, the control circuit to measure a change in voltage across the first stepper motor coil and across the second stepper motor coil, the change in voltage resulting from movement of the rotor, and determine a rotation of the rotor from the change in voltage.

16. The apparatus of claim 15, wherein the stepper motor circuit further comprises:
   a coil reference tie down, wherein a first end of the first stepper motor coil is coupled to a low potential node and the control circuit measures a voltage level at a second end of the first stepper motor coil.

17. The apparatus of claim 15, wherein the first stepper motor coil and the second stepper motor coil are oriented perpendicular to each other.

18. The apparatus of claim 15, wherein the rotation comprises a number of steps the rotor was turned through.

19. The apparatus of claim 15, the control circuit further to determine a direction of rotation of the rotor from the change in voltage.

20. The apparatus of claim 15, wherein the stepper motor circuit comprises a logic gate to determine whether the control signal is provided by the control circuit.

* * * * *